UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PURIFIED CRYSTALLINE ALUMINA AND METHOD OF MAKING THE SAME.

1,276,134.   Specification of Letters Patent.   Patented Aug. 20, 1918.

No Drawing.   Application filed January 5, 1918.   Serial No. 210,499.

*To all whom it may concern:*

Be it known that I, FRANK J. TONE, residing at Niagara Falls, in the county of Niagara and State of New York, have invented a new and useful Improvement in Purified Crystalline Alumina and Methods of Making the Same, of which the following is a full, clear, and exact description.

My invention relates to the manufacture of fused crystalline alumina, and is designed to provide a purified form thereof for abrasive, refractory and other purposes, containing a very small percentage of certain impurities which I have found to affect the crystallization and strength of the abrasive grains.

Crystalline fused alumina is ordinarily produced by the fusing in an electric furnace of various aluminous materials or ores, such as bauxite, emery or clay, a portion of the impurities or foreign material present in such ores, consisting mainly of iron oxid, silica, titanium oxid and lime, being reduced by the addition to the charge of a small percentage of carbon.

This ordinary aluminous abrasive product is well known, and contains from ninety-two to ninety-six per cent. of alumina, from two to four per cent. of titanium oxid, and lesser amounts of iron oxid and silica.

When it is attempted to make a substantially pure crystalline alumina from such crude materials by the usual methods, many difficulties are encountered. In electrically smelting the aluminous material or ore with carbon, it is possible to reduce the oxids of iron and silicon to substantial completeness, but it is impossible to remove the major part of the titanium oxid unless a considerable excess of carbon is used in the mixture. In such case, the crystalline alumina formed is contaminated with carbids or free carbon. The product thus formed disintegrates readily to a powder, giving off hydrocarbon gases including acetylene. It is not suitable for many purposes, such as general abrasive uses or the manufacture of abrasive wheels. It may, however, be concentrated and used for some refractory or chemical purposes.

I have found that among the impurities controlling the crystallizing power of alumina, silica and titanium oxid, and particularly the latter, are of great importance; and in order to get a product in which the crystals may grow freely, as well as to obtain the physical structure desired, where the grains are more brittle and sharper than the ordinary aluminous abrasive containing ninety-two to ninety-six per cent. of alumina, it is necessary to eliminate most of the titanium oxid; and I have discovered a process by which titanium oxid may be reduced to a very small percentage, and at the same time, the product freed from carbid or free carbon.

In carrying out my invention, I divide the operation into two steps, the object of the first step being to reduce the silica and titanium oxid to a point where they will not appreciably affect the crystallizing power of the alumina; while the second step is employed to remove the free carbon or carbids.

I will now describe a preferred form of carrying out my invention, it being understood that the claims are not limited thereto.

I take calcined bauxite of the following composition:

| | |
|---|---|
| $Al_2O_3$ | 81.70 |
| $Fe_2O_3$ | 5.14 |
| $TiO_2$ | 7.33 |
| $SiO_2$ | 5.42 |
| $CaO$ | .35 |

This bauxite is powdered and mixed with carbon in the form of powdered coke in the following proportions: bauxite 100 pounds, petroleum coke 64 pounds. This mixture is fed into an electric furnace which is preferably, though not necessarily, of the type described in my United States Patent No. 929,517, dated July 27, 1909. The mixture is gradually fed into the furnace until the furnace crucible is filled with molten material and the molten material brought to a sufficiently high temperature so that all of the impurities are substantially reduced. The iron and silica are most easily reduced and the titanium oxid with more difficulty. The controlling factor therefore is to have such excess of carbon and such temperature as will reduce the major portion of the titanium. The titanium oxid should be brought down below one per cent. (1%) and preferably below one-half per cent. (½%).

Some of the calcium is converted to calcium carbid. The resulting product has the following typical composition:

| | |
|---|---|
| $Al_2O_3$ | 98.81 |
| $SiO_2$ | .26 |
| $Fe_2O_3$ | .17 |
| $TiO_2$ | .31 |
| $CaO$ | .40 |

The calcium in the above analysis is given as oxid, but is present, at least partially, as carbid, and acetylene is given off on decomposition. The amount of carbon present, as shown in analyses of several samples, may vary from .35 to .55%, which includes some free carbon. These are typical and not absolute limits. This carbon-alumina material consists of small alumina crystals roughly equidimensional and a matrix of the impurities containing the calcium carbid and free carbon. Moisture causes the carbid to decompose, thus breaking up the matrix and freeing the alumina crystals.

The furnace is allowed to cool and the carbon-alumina material is crushed and separated from the metallic impurities by hand separation, magnetic concentration, or other well known means.

This carbon-alumina material is now ground and mixed with iron oxid in the form of mill scale in the proportion of 1425 pounds of carbon-alumina material to 75 pounds of mill scale. This amount of iron oxid is sufficient to oxidize the free carbon or carbids in the alumina, and to give a product consisting of substantially the same composition as the carbon-alumina material above mentioned, with the carbon eliminated and the iron oxid slightly increased. Some of the iron oxid added is reduced. Instead of adding iron oxid in this second step, any other easily reducible oxid may be used, as for example, manganese oxid or chromium oxid, which will oxidize the carbon. The mixture is recharged into the electric furnace, fused and brought to a temperature sufficient to oxidize the carbon. It is then allowed to cool. The mass is then broken up and is ready for the usual crushing and concentrating operations employed in the manufacture of abrasive grains.

The material is distinguished from the regular grade of aluminous abrasive obtained from fusing bauxite in that it has a much more highly developed crystalline structure, the crystals being longer and the crystallization more branching and of skeletal form. When crushed into grain form, the grains are therefore much weaker than grains from the regular aluminous abrasive in which the crystals are much smaller and have a larger proportion of matrix or cementing material to bind them together. It is highly adapted for the manufacture of certain grinding wheels, such as wheels for precision grinding, hardened steel dies and internal grinding where it is necessary to have a grain which will break down readily and always be sharp and free cutting. It is also useful as a refractory material and for chemical purposes.

I have described my process in its preferred form, the fused alumina material being preferably allowed to cool to separate the metallic impurities before reducing and adding the oxidizing agent; but it will be understood that I do not confine myself to this preferred form, as both steps of the method may be carried out without allowing the material to cool between them. Thus, the first step may be carried out as above described, and then, while maintaining the bath in the fused state, I may introduce sufficient iron oxid or its equivalent to oxidize the carbon, after which the furnace will be allowed to cool and the product recovered in the usual manner. I may also tap the contents of the furnace used in both steps of fusing into a second furnace and add the solid oxidizing agent during the process of tapping so as to get a good distribution of it and apply further heat to the second furnace, if necessary, to complete the reaction. In either case I may also add the iron oxid in lump form which is heavier than alumina and by keeping the bath sufficiently fused, a circulation will be induced and the iron oxid will gradually absorb and distribute throughout the bath. The oxid may also be added in the form of rods of fused magnetite which can be forced into the bath until all portions of the bath are fully oxidized.

The solid oxidizing agent may be varied, the material may be cooled, separated and fused again between the two essential steps, or not, as desired, and other changes may be made without departing from my invention.

I also intend to cover the first step of my process, in which the titanium oxid is reduced to less than one per cent., whether the second step is used or not.

I claim:

1. The method of making fused crystalline alumina, consisting in mixing aluminous material with carbon, melting the mass and forming fused alumina containing some carbon or carbids, and then adding to the fused alumina material a solid oxidizing agent to oxidize the carbon or carbids and allowing the mass to cool.

2. The method of making fused crystalline alumina, consisting in mixing aluminous material with an amount of carbon more than sufficient to reduce the impurities, fusing the mass, and adding to the fused alumina sufficient oxid to oxidize the carbon or carbids, and allowing the mass to cool.

3. The method of making fused crystalline alumina, consisting in fusing a mixture of aluminous material and carbon to form fused alumina containing some carbon or carbid, allowing it to cool, separating the impurities, again fusing the carbon-alumina material supplying an oxidizing agent, and oxidizing the carbon or carbons, and allowing the mass to cool.

4. The method of making fused crystalline alumina, consisting in mixing aluminous material with an amount of carbon more than sufficient to reduce all the impurities in the material, bringing the mixture to a temperature sufficient to substantially reduce the impurities and form fused alumina containing some carbon or carbid and less than one per cent. of titanium oxid, and adding an oxidizing agent to the fused carbon-alumina material to oxidize the carbon or carbid.

5. The process of making fused crystalline alumina which consists in first making a mixture of aluminous ore with an amount of carbon more than sufficient to reduce all the impurities in the ore, bringing the mixture to a temperature sufficient to substantially reduce the impurities and to form fused alumina containing some carbon or carbids and less than one per cent. titanium oxid, allowing it to cool, separating the carbon-alumina material from the reduced impurities, mixing the carbon-alumina material with sufficient iron oxid or its equivalent to oxidize the carbon and carbids, recharging said mixture into an electric furnace, and bringing it to a temperature sufficient to fuse the alumina and oxidize the carbon and carbids and allowing the mass to cool.

6. In the process of making a substantially pure fused crystalline alumina from impure materials or ores, the step consisting in smelting the aluminous material or ore with an excess of carbon at such a high temperature as will reduce the titanium oxid impurity to less than one per cent., without substantially reducing the alumina.

7. As a new article of manufacture, the herein described previously fused crystalline alumina containing less than one per cent. and more than one-tenth per cent. titanium oxid and less than one per cent. silica, the material being substantially free from carbids and having a highly crystalline and brittle structure.

8. As a new article of manufacture, the herein described previously fused crystalline alumina containing less than one per cent. and more than one-tenth per cent. titanium oxid, the material being substantially free from carbids and having a highly crystalline and brittle structure.

9. As a new article of manufacture, the herein described previously fused crystalline alumina containing less than one per cent. and over one-tenth per cent. of titanium oxid.

In testimony whereof, I have hereunto set my hand.

FRANK J. TONE.